Nov. 24, 1959     C. J. VARNER     2,914,628
IGNITION CUT-OFF SWITCH
Filed Sept. 20, 1957
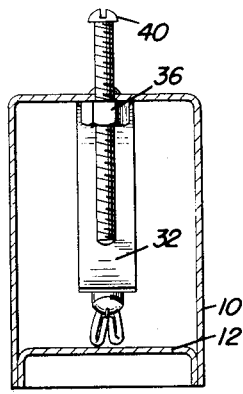
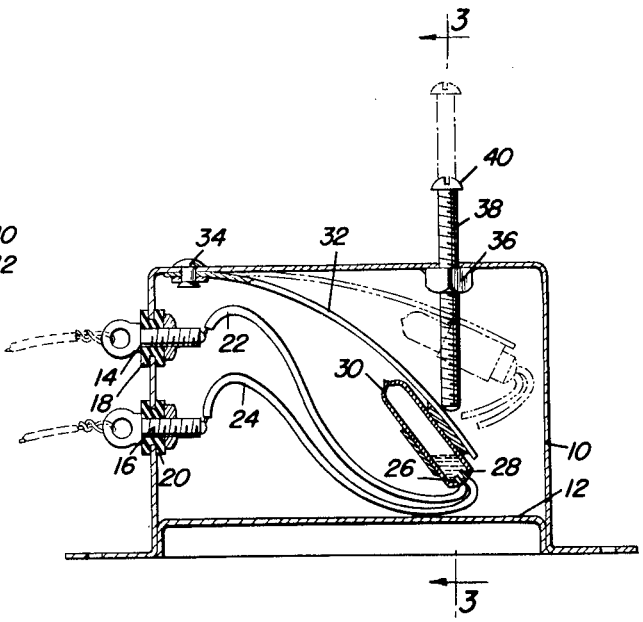
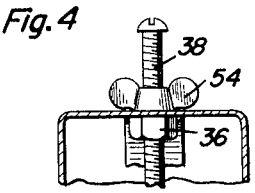
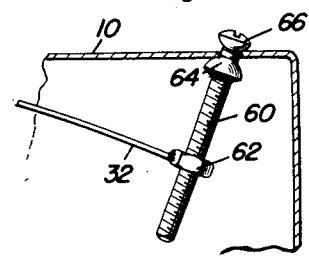
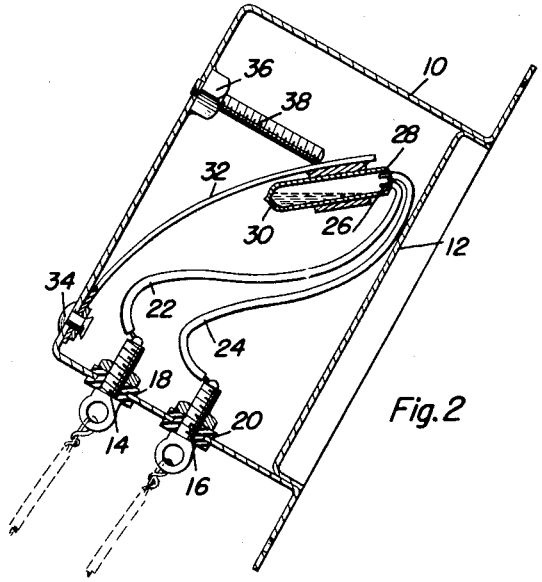
Charles J. Varner
INVENTOR.

2,914,628

IGNITION CUT-OFF SWITCH

Charles J. Varner, Libertyville, Ill.

Application September 20, 1957, Serial No. 685,195

2 Claims. (Cl. 200—61.47)

This invention relates to an ignition cut-off switch and more particularly to a device for use with tractors and other automotive vehicles for automatically shutting off the ignition system and engine when the vehicle tilts to an angle exceeding a pre-set amount so as to eliminate dangers of over-turning and the like.

A further object of the present invention resides in the provision of an ignition shut-off device that will shut off or break the ignition circuit and stop the engine of an automotive vehicle which is so arranged as to allow the device to be adjusted for operation at any desired angle depending upon the characteristics of the vehicle upon which it is to be mounted.

Still further objects and features of this invention reside in the provision of an ignition shut-off switch that is simple in construction, easy to install, having a minimum number of movable parts, which is substantially fool-proof in operation, and which can be adjusted and locked in place or arranged against tampering.

These, together with the various ancillary objects and features of the invention which will become apparent as the following description proceeds, are attained by the ignition shut-off switch, preferred embodiments of which have been illustrated in the accompanying drawings, by way of example only wherein:

Figure 1 is a vertical sectional view of one form of the invention illustrating the mercury switch in an adjusted position;

Figure 2 is a view similar to Figure 1 but illustrating the device in a tilted position;

Figure 3 is a vertical sectional detail view as taken along the plane of line 3—3 of Figure 1;

Figure 4 is a sectional detail view illustrating a modified form of the invention; and Figure 5 is a partial sectional detail view illustrating another modified form of the invention employing a capstan screw.

With continuing reference to the accompanying drawings wherein like reference numerals designate similar parts throughout the various views, and with initial attention directed to the embodiment of the invention as shown in Figures 1 through 3, reference numeral 10 generally designates a housing of any suitable configuration having a base plate 12 adapted to be mounted on a tractor or other suitable vehicle. As is well known when a tractor travels over rough terrain, it often is tilted to a dangerous degree. Many lives have been lost due to the fact that tractors have tilted over on their operators pinning the operators and causing severe injuries if not death. The present invention provides means for automatically cutting off the ignition of the tractor so as to prevent further operation of the tractor at a dangerous angle.

The housing 10 has mounted thereon a pair of terminals 14 and 16 suitably insulated from the housing by means of insulative grommets 18 and 20. To the terminals 14 and 16, conductors 22 and 24 within the housing are attached which conductors are connected to the terminals 26 and 28 of a mercury switch 30 which is preferably fixedly secured to a resilient leaf 32. The leaf 32 is riveted at 34 to the housing 10. A nut 36 is affixed to the housing 10. Threadedly engaged through nut 36 is a screw 38. The screw 38 may be provided with a head 40 enabling the screw to be readily rotated to the leaf 32 to provide an adjusted position for the mercury switch 30. Inasmuch as the leaf 32 continuously urges the end of the leaf against the screw 38, the mercury switch is provided with a resilient mounting maintaining it in an adjusted position. From the form of the invention as is shown in Figure 2, the upper end of the screw once the device has been adjusted may be broken away so that the adjustment may be maintained as desired eliminating the possibility of tampering therewith. Of course, when the tractor becomes tilted to the position wherein the housing assumes the position shown to Figure 2, the contacts 26 and 28 of the mercury switch will no longer be contacted by the mercury and will open thus cutting the ignition system. As shown in Figure 4, in lieu of cutting off the threaded member, a lock nut in the form of a wing nut 54 may be employed. In Figure 5 there is shown a modified form of the invention in which the threaded member 60 is threadedly engaged within a nut or like internally threaded member 62 fixed to the leaf 32 as by welding or the like. The screw 60 is preferably of a capstan type having a bearing member 64 engageable with the underside of the casing 10 and having an upper adjusting head 66.

Figure 2 shows the switch opening or breaking a circuit. By turning the mercury switch end for end a circuit is made or completed as would be used in a magneto type ignition.

In carrying out the invention it is noted that three switches 30 connected in series and housed in housing 10 are employed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An ignition cut-off switch comprising a housing having walls, a resilient leaf in said housing attached at one end thereof to a wall of said housing, an adjustment screw rotatably mounted in one of the walls of said housing and having an inner end located within the housing and an outer end on the exterior of the housing for manual adjustment exteriorly of said housing, said adjustment screw inner end engaging said resilient leaf adjacent one end of said leaf, a mercury switch secured to said one end of said resilient leaf, one housing wall having apertures, insulators in said apertures, terminals carried by said insulators, and conductors interconnecting said mercury switch with said terminals and within said housing.

2. The ignition cut-off switch of claim 1 wherein there are means for locking said screw in a selected adjusted position.

References Cited in the file of this patent

UNITED STATES PATENTS 2,076,928    Witmer _____ Apr. 13, 1937